United States Patent
De Tremiolles et al.

(10) Patent No.: US 6,347,309 B1
(45) Date of Patent: Feb. 12, 2002

(54) CIRCUITS AND METHOD FOR SHAPING THE INFLUENCE FIELD OF NEURONS AND NEURAL NETWORKS RESULTING THEREFROM

(75) Inventors: Ghislain Imbert De Tremiolles, Paris; Pascal Tannhof, Fontainebleav, both of (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/223,478

(22) Filed: Dec. 30, 1998

(30) Foreign Application Priority Data

Dec. 30, 1997 (EP) .............................. 97480103

(51) Int. Cl.$^7$ ................................ G06N 3/06
(52) U.S. Cl. .............................. 706/20; 706/15; 706/18
(58) Field of Search ............................ 706/15, 18, 20, 706/22, 26, 27, 30, 31, 33, 34, 38, 39; 382/157

(56) References Cited

U.S. PATENT DOCUMENTS 5,274,744 A * 12/1993 Yu et al. ........................ 706/20
5,493,688 A * 2/1996 Weingard .................... 382/157
5,634,063 A * 5/1997 Ahn et al. .................... 706/25

OTHER PUBLICATIONS

Bischof, H.; Bertin, E.; Bertolino, P., Voronoi pyramids and Hopfield networks, Pattern Recognition, 1994. vol. 3 —Conference C: Signal Processing, Proceedings of the 12th IAPR International Conference on, Oct. 9–13, 1994, pp.: 330–333 vol. 3.*

Blekas, K.; Likas A.; Stafylopatis, A., A fuzzy neural network approach based on Dirichlet tesselations for nearest neighbor classification of patterns, Neural Networks for Signal Processing [1995] V. Proceedings of the 1995 IEEE Workshop, Aug. 31–Sep. 2.*

Bose, N.K.; Garga, A.K., Neural network design using Voronoi diagrams, Neural Networks, IEEE Transactions on, vol.: 4 5, Sep. 1993, pp.: 778–787.*

(List continued on next page.)

*Primary Examiner*—Kevin J. Teska
*Assistant Examiner*—Wilbert L. Starks, Jr.
(74) *Attorney, Agent, or Firm*—Ronald L. Drumheller (57) ABSTRACT

The improved neural network of the present invention results from the combination of a dedicated logic block with a conventional neural network based upon a mapping of the input space usually employed to classify an input data by computing the distance between said input data and prototypes memorized therein. The improved neural network is able to classify an input data, for instance, represented by a vector A even when some of its components are noisy or unknown during either the learning or the recognition phase. To that end, influence fields of various and different shapes are created for each neuron of the conventional neural network. The logic block transforms at least some of the n components (A1, . . . , An) of the input vector A into the m components (V1, . . . , Vm) of a network input vector V according to a linear or non-linear transform function F. In turn, vector V is applied as the input data to said conventional neural network. The transform function F is such that certain components of vector V are not modified, e.g. Vk=Aj, while other components are transformed as mentioned above, e.g. Vi=Fi(A1, . . . , An). In addition, one (or more) component of vector V can be used to compensate an offset that is present in the distance evaluation of vector V. Because, the logic block is placed in front of the said conventional neural network any modification thereof is avoided.

2 Claims, 9 Drawing Sheets

OTHER PUBLICATIONS

Brönnimann, Hervé and Goodrich, Michael T.; Almost optimal set covers in finite VC–dimension: (preliminary version); Proceedings of the tenth annual symposium on Computational geometry, Jun. 6–8, 1994, pp. 293–302.*

Esat, I., Neural network design based on decomposition of decision space, Neural Information Processing, 1999. Proceedings. ICONIP '99. 6th International Conference on, vol.: 1, Nov. 16–20, 1999, pp.: 366–370 vol. 1.*

Gentile, C.; Sanaier, M., An improved Voronoi–diagram based neural net for pattern classification, Neural Networks, 1999. IJCNN '99. International Joint Conference on, vol.: 5, Jul. 10–16, 1999, pp.: 3075–3080 vol. 5.*

Garga, A.K.; Bose, N.K., Structure training of neural networks, Neural Networks, 1994. IEEE World Congress on Computational Intelligence., 1994 IEEE International Conference on, vol.: 1, Jun. 27–Jul. 2, 1994, pp.: pp.: 239–244 vol. 1.*

Lee, Hahn–Ming; Hsu, Ching–Chi; The handling of don't care attributes, Neural Networks, 1991. 1991 IEEE International Joint Conference on, Nov. 18–21, 1991, pp. : 1085–1091 vol. 2.*

McLean, D.; Bander, Z.; O'Shea, J.D., Decision boundry modelling–a constructive algorithm for high precision real world data models, Neural Networks, 1999. IJCNN '99. International Joint Conference on, vol.: 5, Jul. 10–16, 1999, pp.: 3114–3118 vol. 5.*

Rogers, G.W.; Solka, J.; Malyevac, D.S.; Priebe, C.E., A self–organizing network for computing a posteriori conditional class probability, Systems, Man and Cybernetics, IEEE Transactions on, vol.: 23 6, Nov.–Dec. 1993, pp.: 1672–1682.*

Hassoun, Mohamad H., Fundamentals of Artificial Neural Networks, The MIT Press, Cambridge, Massachusetts, Mar. 27, 1995.*

Haykin, Simon, Neural Networks: A comprehensive Foundation, Macmillan College Publishing Company, Jan. 1994.*

Korn, Granino A., Neural Networks and Fuzzy–Logic Control on Personal Computers and Workstations, The MIT Press, Cambridge, Massachusetts, Jan. 1995.*

Baras, J.S.; La Vigna, A., Convergence of a neural network classifier, Decision and Control, 1990., Proceedings of the 29th IEEE Conference on, Dec. 5–7, 1990, pp.: 1735–1740 vol. 3.*

* cited by examiner

CIRCUITS AND METHOD FOR SHAPING THE INFLUENCE FIELD OF NEURONS AND NEURAL NETWORKS RESULTING THEREFROM

FIELD OF INVENTION

The present invention relates to neural network systems and more particularly to circuits and a method for shaping the influence fields of neurons. These circuits that are placed in front of any conventional neural network based upon a mapping of the input space significantly increases the number of permitted influence field shapes, giving thereby a considerable flexibility to the design of neural networks. The present invention also encompasses the neural networks that result from that combination that are well adapted for classification and identification purposes. In particular, the neural networks of the present invention find extensive applications in the field of image recognition/processing.

BACKGROUND OF THE INVENTION

Artificial neural networks mimic biological nervous systems to solve problems which are difficult to modelize. Neural networks are able to learn from examples and in that sense, they are said to be "adaptive". Depending on the construction of neural networks, the learning phase can be supervised or not. Another important property of neural networks is their ability to show some tolerance for the imprecision and uncertainty which naturally exist in real-world problems to achieve tractability and robustness. In essence, these properties result from their massively parallel arrangement in which input data are distributed. In a typical representation, the hardware implementation of neural networks generally consists of elementary processing units, called neurons, that are connected in parallel and are driven via weighted links, called synapses. There are a great number of application fields for neural networks. They are extensively used in process control, image recognition/processing, time series prediction, optimization, and the like.

Since the forty's, a lot of different types of neural networks have been developed and described in the literature. The key distinction factors are the way they learn, their generalization capability, their response time and their robustness, i.e. their tolerance to noise and faults. Among the different types of conventional neural networks, those based upon a mapping of the input space appear to be the most promising to date. This type of networks is particularly interesting because of its simplicity of use and its short response time. Several hardware implementations of algorithms exploiting this approach are available in the industry.

Neural networks that are based upon a mapping of the input space require some kind of classification. According to the so-called "Region Of Influence (ROI)" technique, for each area of this input space, one category (or several categories) is (are) associated thereto to allow classification of new inputs. Another conventional classification technique is the so-called K-Nearest Neighbors (KNN). These classification techniques as well as others are widely described in literature.

According to the ROI technique which is the classification technique most commonly used to date, each area is determined in an n-dimensional space by a center and an influence field, which is nothing other than a threshold, thereby defining a hypersphere. For instance, in a three-dimensional space, the influence field can be represented by a sphere. The definition "influence field" is also referred to as the "decision surface", the "region of influence" or the "identification area" in technical literature, all these terms may be considered as equivalent, at least in some respects. RCE (RCE stands for Restricted Coulomb Energy) neural networks belong to this class of neural networks based upon a mapping of the input space.

In the KNN technique, each area is determined in a n-dimensional space by a prototype which defines a Voronoï domain. All the points enclosed in this domain have this prototype as the closest neighbor.

Figure 1:
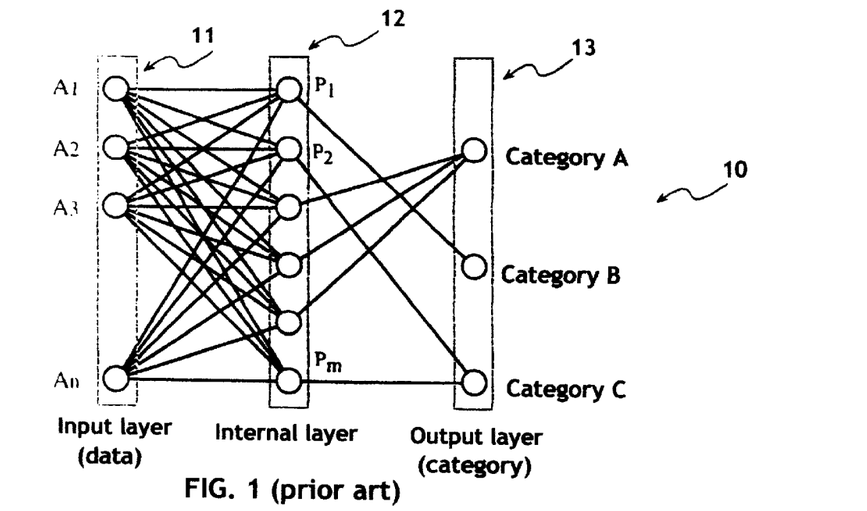
FIG. 1 schematically shows the typical topology of a neural network of the ROI type comprised of three layers and 6 neurons (or nodes).

Let us consider for sake of simplicity, ROI neural networks. Basically, the ROI neural network is comprised of three interconnected layers: an input layer, an internal (or hidden) layer and an output layer. The internal layer consists of a plurality of nodes or neurons. Each node is a processing unit which computes the distance between the input data applied to the input layer and a weight stored therein. Then, this distance is compared with a threshold. In this particular implementation, the input layer simply consists of a plurality of input terminals. The role of the output layer is to provide the category (or categories) to the user corresponding to the class of the input data. FIG. 1 schematically summarizes the above description of a conventional ROI neural network referenced 10.

Now turning to FIG. 1, the input data is applied to the input layer 11 of ROI network 10. The input data is represented by a vector A whose components are labelled A1 to An. Each component is applied to an input terminal, then to each of the m neurons of the internal layer 12. Each neuron memorizes a prototype, labelled P1 to Pm representing an n component vector which corresponds to the above mentioned weight. The components of prototype vector P1 are labelled P1,1, . . . , P1,n. The output layer 13 is designed to provide the categories. In FIG. 1, only three categories A, B and C have been represented. In the implementation of FIG. 1, the output layer 12 consists of three output terminals, that can be materialized by LEDs. The components of the prototype vector are dynamically established during the learning phase.

Therefore, the ROI algorithm consists in mapping out a n-dimensional space by prototypes to which are assigned a category and a threshold. The role of this threshold is to activate or not the associated neuron. On the other hand, the aim of the learning phase is to map out the input space so that parts of this space belong to one or several categories. This is performed by associating a category to each prototype and computing the influence field for each neuron in the ROI approach. The influence field is a way of defining a subspace demarcated by the threshold in which the neuron is active. When a new prototype is memorized, thresholds of neighbor neurons can be adjusted to reduce any category conflict between the influence fields of these neurons.

The classification of input data is the essential task of neural networks based upon a mapping of the input space. It first consists of computing distances between the input data and prototypes stored in the different neurons of the neural network. The distances are compared with the associated thresholds, and zero, one or several categories are assigned to the input data in the ROI technique. In the KNN approach mentioned above, the output layer is used to determine the k shortest distances.

To compute a distance between the input vector A (components A1, . . . , Ai, . . . , An) and the memorized prototype vector Pj (components Pj,1, . . . , Pj,i, . . . , Pj,n) in the n-dimensional space, several kinds of norms can be used. An easy way is to determine the Euclidian distance, also referred to as the L2 norm, i.e. $Dist_j E2 = \Sigma A (Ai - Pj,i)^2$ that will produce a hyperspherical influence field. However, this approach is not currently used because it is difficult to efficiently implement with dedicated circuits (squaring circuits consume too much room). The most extensively used norms to date are the so-called "L1" (or "Manhattan") norm and the "Lsup" norm. According to norm L1, the distance is given by: $\text{Dist}_j = \Sigma\ |Ai - Pj,i|$ while according to Lsup, the distance is given by: $\text{Dist}_j = \text{Max}|Ai - Pj,i|$. In a two-dimensional space, the iso-distances are represented by lozenges with the L1 norm, and by squares with the Lsup norm. The following explanation will give more details.

Figure 2A:
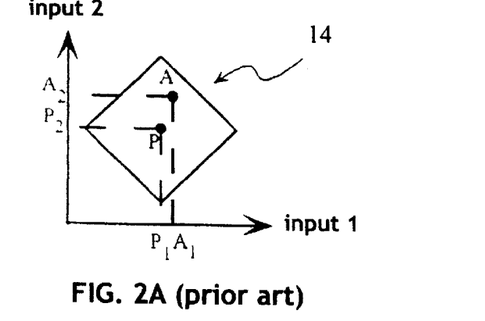
Figure 2B:
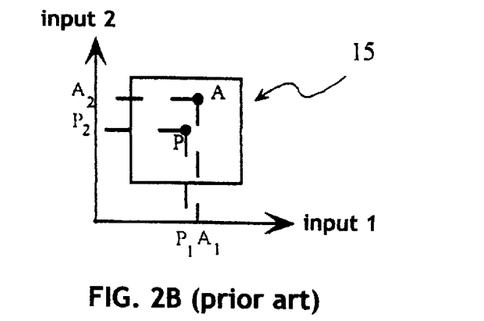

The respective shapes of the influence field regions that are obtained when the distance between an input vector A (components A1 and A2) and a prototype vector P1 (components P1,1 and P1,2) after computation with norms L1 and Lsup in a two-dimensional space are shown in FIGS. 2A and 2B where they are referenced 14 and 15 respectively.

Figure 3:
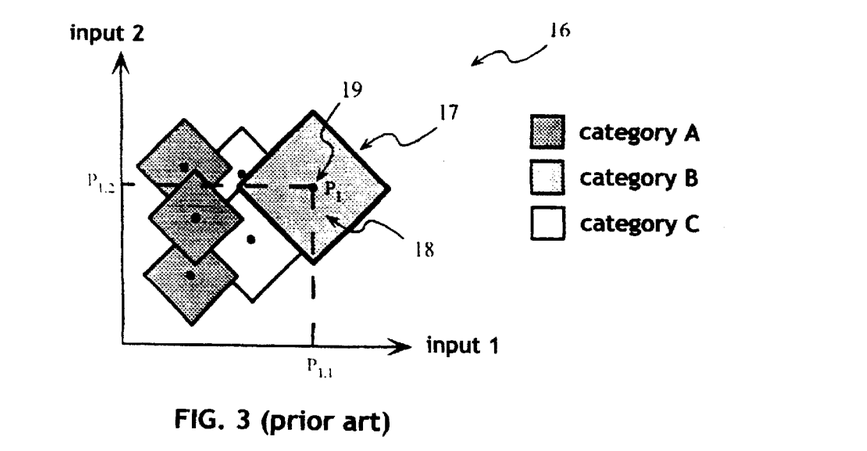
FIG. 3 shows a typical example of the input space mapping in a two-dimensional space using the ROI network of FIG. 1 where each neuron has memorized a prototype.

Now, FIG. 3 shows a simple example of mapping input vectors in a two-dimensional space in accordance with the neural network 10 in FIG. 1, when using six neurons and norm L1. In this mapping 16, prototype P1 (components P1,1 and P1,2) referenced 17 which belongs to category B, is emphasized. Prototype 17 is fully characterized by its influence field 18 (which determines the threshold) and its center 19.

Figure 4:
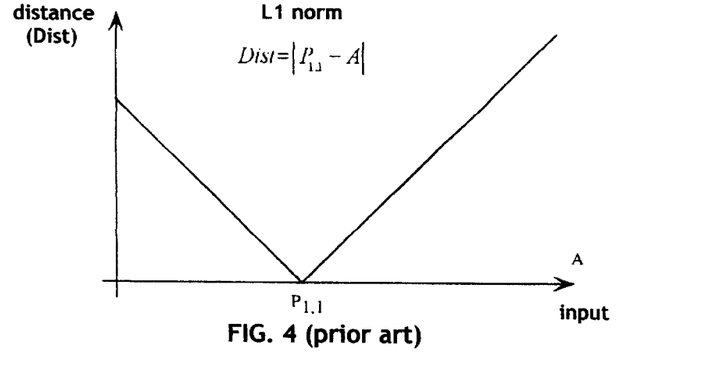
FIG. 4 shows the classic distance vs input data diagram in a one-dimensional space the transmission characteristic for any memorized prototype of FIG. 3.

FIG. 4 shows the classic distance vs input data (vector) diagram for prototype 17 of FIG. 3. in a one-dimensional space (i.e. along the horizontal dotted line visible in FIG. 3), which illustrates the typical V shape of the transmission characteristics. A similar diagram would be obtained, should the Lsup norm be used.

Typical implementations of ROI and KNN neural networks based upon a mapping of the input space can be found in a family of silicon chips developed and commercialized by the IBM Corporation under the reference ZISC036 (ZISC is a registered trade mark of IBM Corp.). The reader may refer to U.S. Pat. No. 5,621,863 to Boulet et al, assigned to the assignee of the present invention, for more details on this introductory part. To each neuron is associated a RAM memory that is adapted to store 64 components of 8 bits each. The distances are computed using either one of the two norms L1 or Lsup at user's will.

Figure 5A:
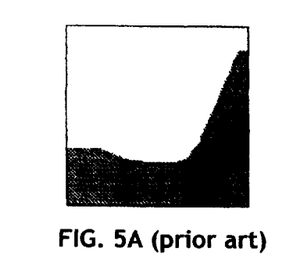
Figure 5B:
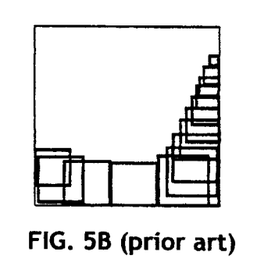

Unfortunately, even with the innovative neuron architectures described in Boulet et al, it is impossible to encode complex images such as the picture shown in FIG. 5A with a few neurons. As a matter of fact, FIG. 5B shows that at least 14 neurons are necessary to satisfactorily cover the picture. The reason is that the distance evaluator circuit does not allow that a distance could be constant in a defined range of value, limiting the permitted shapes to the lozenge and the square mentioned above.

Figure 6:
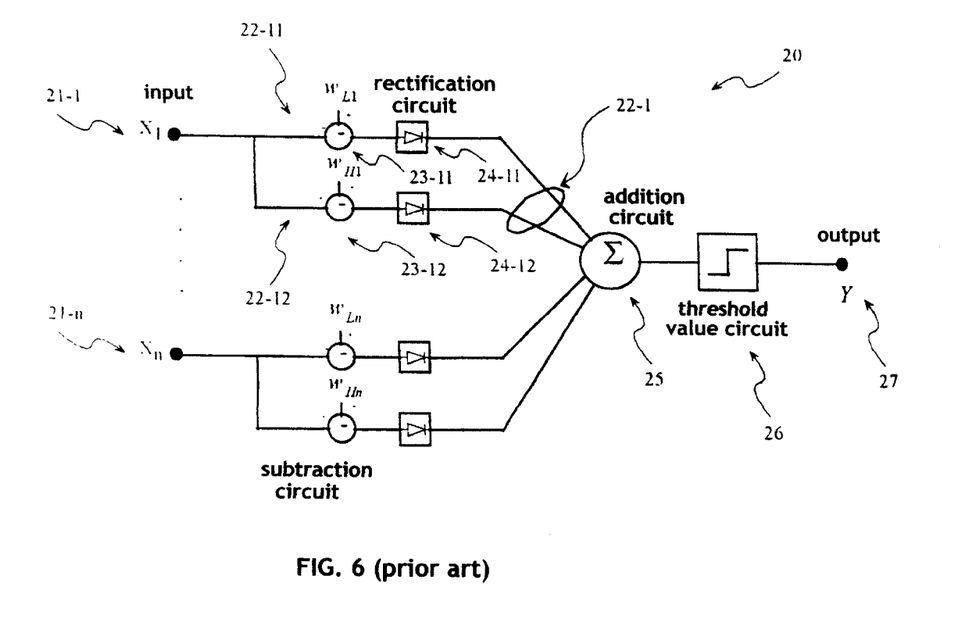
FIG. 6 shows the basic circuit described in U.S. Pat. No. 5,166,539 that has been designed to introduce a new influence field shape (a quasi-rectangle) besides the classic square (when norm L1 is used).

U.S. Pat. No. 5,166,539 to Uchimura et al describes an attempt to minimize in some respect this limitation, although this reference appears to be more particularly concerned with the reduction of the chip area and its electric consumption when integrated in silicon using a VLSI technology. The improved neuron described in FIG. 3 of Uchimura et al is now shown in FIG. 6 of the instant application. Now turning to FIG. 6, the neuron referenced 20 includes: n input terminals 21-1 to 21-n (where n is an integer greater than 1) receiving n input signals X1 to Xn (corresponding to the components of an input vector X). To each input terminal, e.g. 21-1, is associated a link, e.g. 22-1, that is comprised of two branches, e.g. 22-11 and 22-12. In each branch of the link, a subtraction circuit having a determined threshold value (or weight) associated thereto is connected in series with a rectification circuit. For instance, in branch 22-11, subtraction circuit 23-11 (weight: WL1) is connected in series with rectification circuit 24-11. On the other hand, in branch 22-12, subtraction circuit 23-12 (weight WH1) is connected in series with rectification circuit 24-12. All the signals output by the rectification circuits of FIG. 6 are summed in addition circuit 25. The presence of this addition circuit 25 reveals that the distance is computed with norm L1. Finally, a threshold value circuit 26 connects the output of addition circuit 25 to an output terminal 27 where output signal Y is available.

The subtraction circuits (e.g. 23-11) determine the difference between input signals and weight coefficients, i.e. they determine the results of (input signal-WH) and (WL-input signal), where WH is the greater value of the two weight values WH and WL. Rectification circuits are used to pass only positive values. The addition circuit 25 accumulates all the results of the intermediate absolute value calculations. The threshold circuit 26, into which the accumulation results are inputted, is used to generate the output signal Y of the neuron 20 at output terminal 27.

Figure 7A:
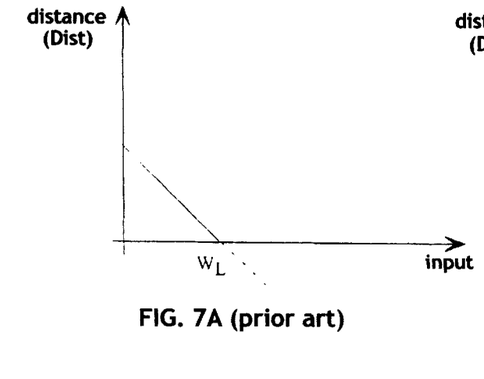
Figure 7B:
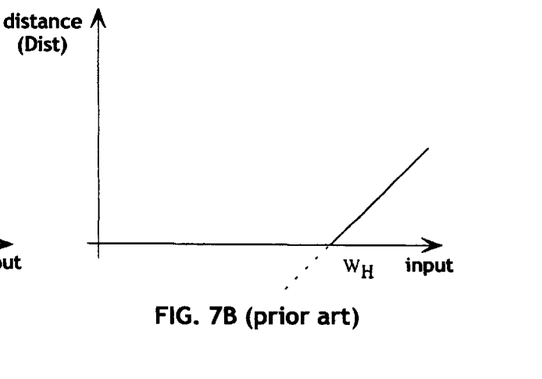
Figure 8:
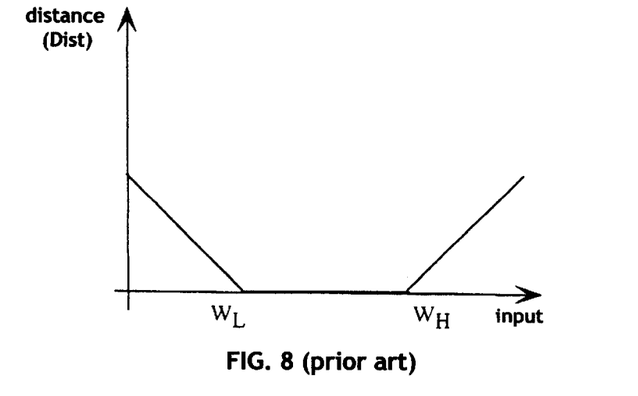
FIG. 8 shows the distance vs input data diagram in a 1-dimensional space illustrating the transmission characteristic that is finally obtained with the FIG. 6 circuit.

As a matter of fact, in the neuron 20 shown in FIG. 6, the subtraction and rectification circuits could be viewed as distance evaluator circuits using partial absolute value. FIG. 7 is comprised of FIGS. 7A and 7B which show respectively the distance vs input diagram corresponding to the transmission characteristics of links 24-11 and 24-12 just before the signals are applied to the addition circuit 25. FIG. 8 shows the transmission characteristic which results after summing these transmission characteristics at the output of addition circuit 25. In other words, the distance vs input diagram shown in FIG. 8 corresponds to the summation of the signals appearing on links 22-11 and 22-12 in addition circuit 25 and thus represents the distance evaluation (made according to norm L1) between the input signal (e.g. X1) and a prototype (e.g. P1) memorized in the neuron 20 according to the two associated weights (e.g. WH1 and WL1). Note that if all the pairs of weights are equal, i.e. WHi=WLi, the distance evaluation is the same with conventional neurons using norm L1 and will produce lozenge shaped influence fields.

Figure 9:
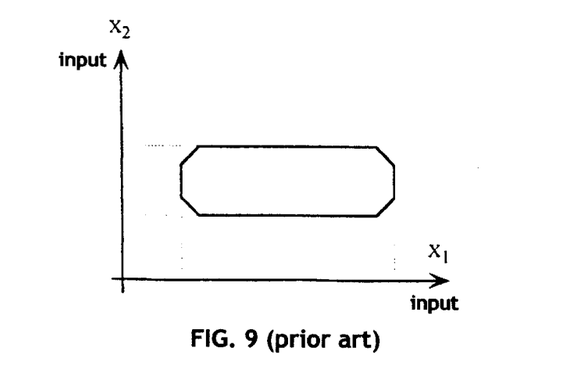
FIG. 9 shows the influence field shape, a quasi-rectangle having a fixed orientation (necessarily parallel to either one of the two axis) that is obtained thanks to the FIG. 6 circuit.

Finally, the influence field that is obtained by Uchimura et al in a two-dimensional space, as a result of the FIG. 8, has the general shape of a rectangle illustrated in FIG. 9. It is worthwhile to note that according to Uchimura et al teachings, a new shape, referred to as a quasi-rectangle is added to the conventional lozenge, the only shape available thus far with the L1 norm.

The technique described in Uchimura et al exhibits some drawbacks.

The first one lies in the size of memory and circuitry needed to store all the weights. A lot of applications do not need a rectangular-shaped influence field, thus the conventional lozenge shape is quite adequate. According to Uchimura et al, for every component, we have WH=WL, so that with neural network having 64 weights, only 32 components instead of 64 could be used. For such applications, it should not be necessary to store the two values when a simple absolute value circuit would be sufficient to give satisfactory results, thereby saving a significant silicon area (memory and circuitry) and power consumption.

Another significant drawback relates to the particular influence field shape that is obtained according to Uchimura et al which is limited to a quasi-rectangle (in a 2-dimensional space) having a specific orientation. However, very often, other orientations and other shapes are required, for instance to produce freely selectable relatively complex shapes, without necessitating an extremely large number of neurons. On the other hand, the FIG. 6 circuit produces isomorphic or non-isomorphic but regular shapes, which is a further limitation.

According to Uchimura et al, adding the form of a quasi-rectangle to the conventional lozenge-shaped influence field can be analyzed as providing a partial "don't care" value in the memorized prototype. By "don't care", it should be understood that whatsoever the input data is, the distance will be constant in the range defined by weights WL and WH. However, another essential need when dealing with neural networks to solve real world problems, is the use of incomplete (noisy) and unknown input data. Let us consider a neural network that has correctly learned, so that an accurate mapping of the input space has been obtained. In the recognition phase of input data that includes noisy data, a partial "don't care" on the noisy data becomes quite mandatory. Such a partial "don't care" on the input data is not possible according to Uchimura et al.

Finally, the circuit described in Uchimura et al does not have the desired flexibility in the sense that the content of the neuron's internal circuitry is totally dedicated to construct the quasi-rectangle shape mentioned above. As a consequence, it would be highly desirable to overcome all the above mentioned limitations or drawbacks.

SUMMARY OF THE INVENTION

It is therefore a primary object of the present invention to provide circuits and a method for shaping the influence field of neurons that offer new shapes to the circuit engineer for greater flexibility in the circuit design.

It is another object of the present invention to provide circuits and a method for shaping the influence field of neurons according to isomorphic or non-isomorphic, regular or irregular, shapes.

It is another object of the present invention to provide circuits and a method for shaping the influence field of neurons which allows the use of partial or total "don't care" values both on the memorized prototypes.

It is another object of the present invention to provide circuits and a method for shaping the influence field of neurons which allows the use of partial or total "don't care" values both on the input data.

It is another object of the present invention to provide circuits and a method for shaping the influence field of neurons which allows to group several input data into one and only data when the "don't care" values is applied on the input data to improve the global response time of the neural network incorporating such neurons.

It is another object of the present invention to provide circuits and a method for shaping the influence field of neurons which allows to group several prototypes into one and only prototype when the "don't care" values is applied on the memorized prototypes to reduce the number of neurons in the neural network.

It is still another object of the present invention to provide circuits and a method for shaping the influence field of neurons that are placed in front of any neural network based upon a mapping of the input space that does require any change therein.

It is still another further object of the present invention to provide circuits and a method for shaping the influence field of neurons that improves the classification and identification capabilities of any neural network based upon a mapping of the input space.

It is still another further object of the present invention to provide circuits and a method for shaping the influence field of neurons that improves the response time of conventional neural networks based upon a mapping of the input space by recognizing only one input data patterns which groups several ones.

The improved neural network of the present invention results from the combination of a dedicated logic block with a conventional neural network based upon a mapping of the input space usually employed to classify an input data by computing the distance between said input data and prototypes memorized therein. The improved neural network is able to classify an input data represented by a vector A even when some of its components are noisy or unknown during either the learning or the recognition phase. To that end, influence fields of various and different shapes are created for each neuron of the conventional neural network through this combination. The logic block transforms at least some of the n components (A1, . . . , An) of the input vector A into the m components (V1, . . . , Vm) of a network input vector V according to a linear or non-linear transform function F. In turn, vector V is applied as the input data to said conventional neural network. The transform function F is such that certain components of vector V are not modified, e.g. Vk=Aj, while other components are transformed as mentioned above, e.g. Vi=Fi(A1, . . . , An). In addition, one (or more) component of vector V can be used to compensate an offset that is present in the distance evaluation of vector V. Because, the logic block is placed in front of the said conventional neural network any modification thereof is avoided.

The novel features believed to be characteristic of this invention are set forth in the appended claims. The invention itself, however, as well as other objects and advantages thereof, may be best understood by reference to the following detailed description of an illustrated preferred embodiment to be read in conjunction with the accompanying drawings.

BRIEF DESCRIPTION OF THE DRAWINGS

FIG. 2 is comprised of FIGS. 2A and 2B which show the shape of the influence field in a two-dimensional space when the distance evaluation is performed with the L1 and the Lsup norms respectively.

FIG. 5 is comprised of FIGS. 5A and 5B which show respectively a complex image and its representation when approximately coded with the minimum number of influence field shapes (using Lsup norm) each pertaining to a neuron.

FIG. 7 is comprised of FIGS. 7A and 7B which show respectively the distance vs input data diagrams of the subtraction and rectification circuits used in the FIG. 6 circuit respectively.

FIG. 10 is comprised of FIGS. 10A and 10B which show respectively the distance vs input diagram illustrating the novel transfer characteristics in the partial and total "don't care" cases when applied to the memorized prototypes according to the present invention.

FIG. 12 is comprised of FIGS. 12A and 12B which show respectively the distance vs prototype component value diagram illustrating the novel transfer characteristics of the partial and total "don't care" cases when applied to the input data according to the present invention.

DESCRIPTION OF THE PREFERRED EMBODIMENTS

The Basic Principles

The accomplishment of the above mentioned objects is achieved by the circuits and the method of the present invention which is based upon three basic principles. First, the use of partial or total "don't care" value not only in the memorized prototype as taught at least in some extent in Uchimura et al, but also on the input data to be able to process incomplete (noisy) and unknown data. Secondly, the desirability to have various isomorphic or non-isomorphic, regular and irregular, influence field shapes. Finally, to design circuits that are adaptable to any neural network based upon a mapping of the input space without requiring any change therein.

In essence, the present invention suggests a new way to compute the distance between the input vector and a memorized prototype. The classic equation of the distance evaluation still according to the L1 norm in a one-dimensional space for the sake of simplicity is: $Dist=|A1-P1,1|$ using the same notations as above, i.e. P1,1 is the first component of memorized prototype P1 and A1 is the corresponding component of the input vector A. Now, according to the present invention, the following equation will be used instead: $Dist=|V1-P1,1|+|V2-P1,2|$ (1) wherein two components of a vector V and the memorized prototype P1 are used. As a matter of fact, V1 and V2 are two components of a vector V which is derived from input vector A by a transform function. To be distinguished from the input vector A, vector V will be referred to as an network input vector. Let us explain this important aspect of the present invention in more details.

Let us first apply the partial "don't care" to the memorized prototype P1. This case is characterized by an input vector A having one component A1 (i.e. in a one-dimensional space) and a network input vector V having two components V1 and V2 (i.e. in a two-dimensional space) such that $V1=V2=A1$ while the components P1,1 and P1,2 of prototype P1 (in a two-dimensional space) have different values. This change in the dimensions of the space that can be noticed is due to the transform function which in this case ensures the equality: $V1=V2=A1$.

Figure 10A:
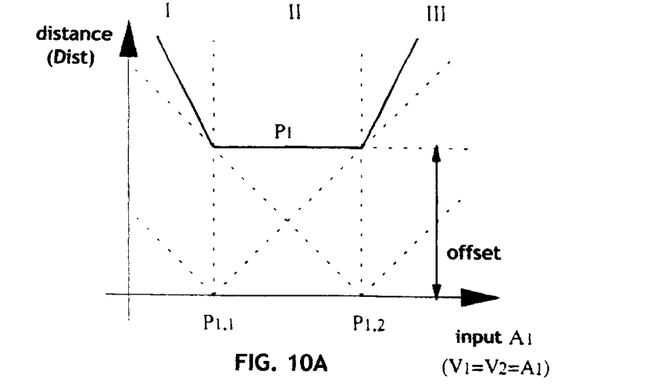
Figure 10B:
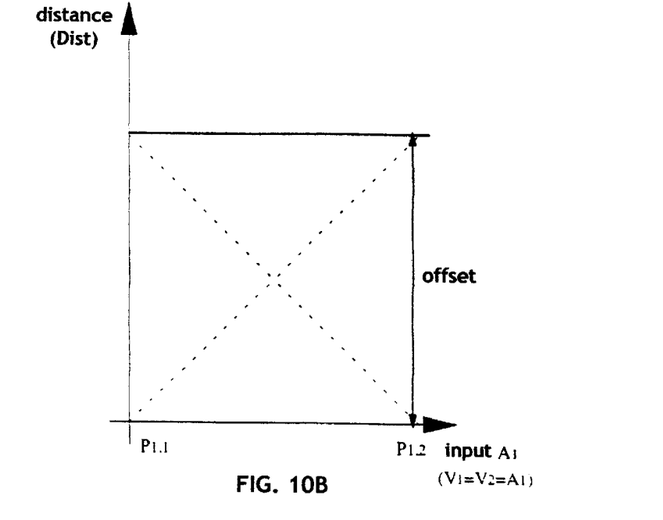

The general equation (1) mentioned above, i.e. $Dist=|V1-P1,1|+|V2-P1,2|$ thus becomes $Dist=|V1-P1,2|$ and it may be formulated as shown below (assuming $P1,1<P1,2$):

| if V1 < P1,1 | Dist = \|V1 − P1,1\| + \|V1 − P1,2\| |
| (zone I) | Dist = (P1,1 − V1) + (P1,2 − V1) |
| | Dist = 2 (P1,1 − V1) + (P1,2 − P1,1) (2) | i.e. the distance is comprised of a variable (the first member) and a constant (the second member);

| if P1,1 < = V1 < = P1,2 | Dist = \|V1 − P1,1\| + \|V1 − P1,2\| |
| (zone II) | Dist = (V1 − P1,1) + (P1,2 − V1) |
| | Dist = (P1,2 − P1,1) (3) | in this case, the distance is equal to the a constant; and,

| if V1 > P1,2 | Dist = \|V1 − P1,1\| + \|V1 − P1,2\| |
| (zone III) | Dist = (V1 − P1,1) + (V1 − P1,2) |
| | Dist = 2(V1 − P1,2) + (P1,2 − P1,1) (4) | i.e. the distance is comprised of a variable (the first member) and a constant (the second member);

The relationship between the distance and a memorized prototype in a one-dimensional space, i.e. the transmission characteristic, has the general aspect shown in FIG. 10 which is comprised of FIGS. 10A and 10B. As apparent from FIG. 10, the transmission characteristic of prototype P1 has a constant distance in a defined range [P1,1;P1,2] which measures the above mentioned "offset" to address either the partial "don't care" (FIG. 10A) or the total "don't care" (FIG. 10B) aspects. FIG. 10B illustrates a particular case of FIG. 10A to show the transmission characteristic for the total "don't care" of the whole input range (in this case, component A1 is totally inhibited) that is obtained by making P1,1=min(input data range) and P1,2=max(input data range) for the memorized prototype.

In each zone (see FIG. 10A), the distance Dist is equal to a variable (which may be null) plus the same constant. This constant will be referred to hereinafter as the "offset". After having computed the distance, the constant (P1,2−P1,1) can thus be subtracted from the result to generate the variable part of the distance.

Figure 11:
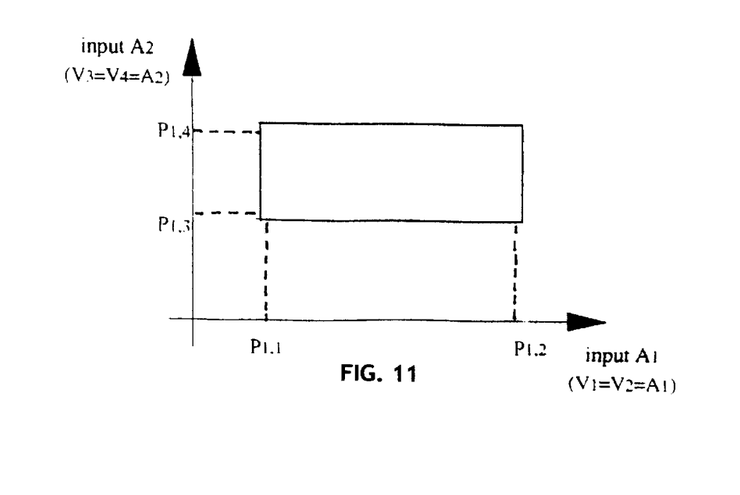
FIG. 11 shows a typical example of an influence field shape, i.e. a rectangle, that is obtained with the norm Lsup in the FIG. 10 according to the present invention.

The influence field shape that is obtained with the L1 norm and an input vector A in a two-dimensional space, i.e. A=(A1, A2) is still a quasi-rectangle. However, if the Lsup norm is used, it will then look like the true rectangle shown in FIG. 11. In this case, the network input vector V=(V1, V2, V3, V4) in a four-dimensional space is such as V=(V1=A1, V2=A1,V3=A2,V4=A2).

Let us now apply the partial "don't care" on the input data. We have to consider memorized prototype P1 the first two components P1,1 and P1,2 are equal, i.e. P1,1=P1,2, and two network input data V1 and V2, so that in this case, the same mathematical analysis applies.

The general equation (1) mentioned above, i.e. Dist=|V1−P1,1|+|V2−P1,2|becomes in the second case Dist=V1−P1,1|+|V2−P1,1|and it may be formulated as shown below (assuming V1<V2):

| if P1,1 < V1 | Dist = |V1 − P1,1| + |V2 − P1,1| |
|---|---|
| (zone I') | Dist = (V1 − P11,1) + (V2 − P1,1) |
| | Dist = 2(V1 − P1,1) + (V2 − V1) (5) | i.e. the distance is comprised of a variable (the first member) and a constant (the second member);

| if V1 < = P1 < = V2 | Dist = |V1 − P1,1| + |V2 − P1,1| |
|---|---|
| (zone II') | Dist = (P1,1 − V1) + (V2 − P1,1) |
| | Dist = (V2 − V1) (6) | in this case, the distance is equal to the a constant; and,

| if P1,1 > V2 | Dist = |V1 − P1,1| + |V2 − P1,1| |
|---|---|
| (zone III') | Dist = (P1,1 − V1) + (P1,1 − V2) |
| | Dist = 2(P1,1 − V2) + (V2 − V1) (7) | the distance is equal to a variable plus the same constant. This constant is still the above mentioned offset.

Figure 12A:
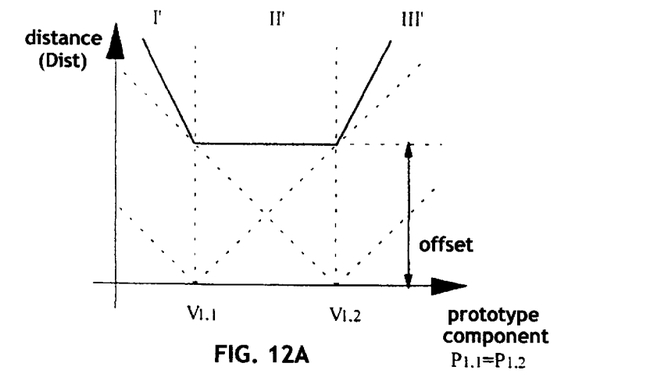
Figure 12B:
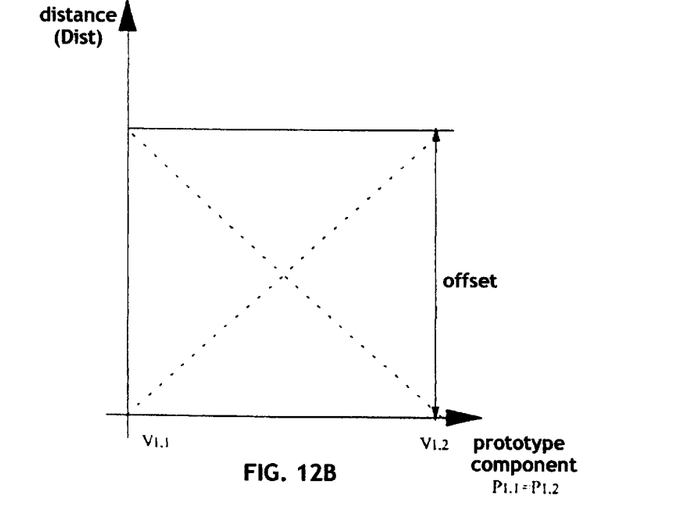

FIG. 12 is comprised of FIG. 12A and 12B which show respectively the transmission characteristic for the partial "don't care" and the total "don't care" when applied to the input data. The three zones labelled I', II' and III' mentioned above are depicted in FIG. 12A.

Figure 13:
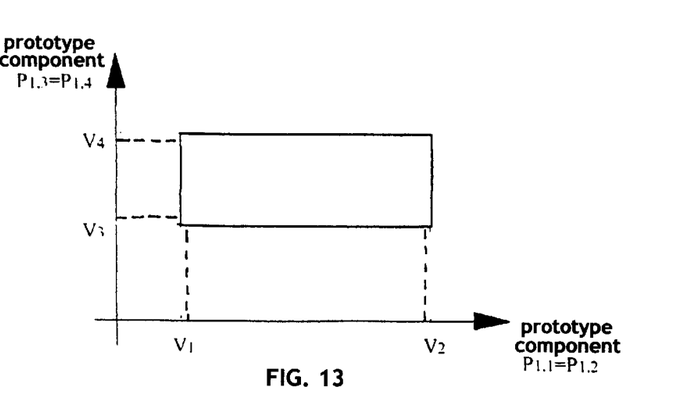
FIG. 13 shows the typical example of an influence field shape, i.e. a rectangle, that is obtained with norm Lsup in the FIGS. 12A and 12B cases according to the present invention.

FIG. 13 now shows the influence field of the neural network as a whole that is obtained in this case still with the Lsup norm for an input vector A=(A1, A2) in a two-dimensional space and a prototype P1=(P1,1, P1,2, P1,3, P1,4), such as P1,1=P1,2 and P1,3=P1,4 and a network input vector V=(V1, V2, V3, V4) both in a four-dimensional space.

Therefore, the distance evaluation can be performed two different ways. According to the first one, for each component (e.g. A1) of input vector A, the two values defining the "don't care" range value, (e.g. P1,1 and P1,2) are stored as two different components of the memorized prototype (e.g. P1) in the learning phase. This creates the "don't care" on the memorized prototype. During the recognition phase, each component (e.g. A1) of input vector A is transformed in two components (e.g. V1 and V2) of a network input vector that have the same value. This is performed for all the neurons of the neural network. In the other one, for each component (e.g. A1) of the input vector A, the corresponding components (e.g. V1 and V2) of network input vector V are stored as two identical values in the memorized prototype as the components thereof during the learning phase. During the recognition phase, the input vector data A is applied as two network input components (e.g. V1 and V2) having different values to create the desired "don't care" range value on the input data. In both cases, the desired partial "don't care" is created.

Figure 14:
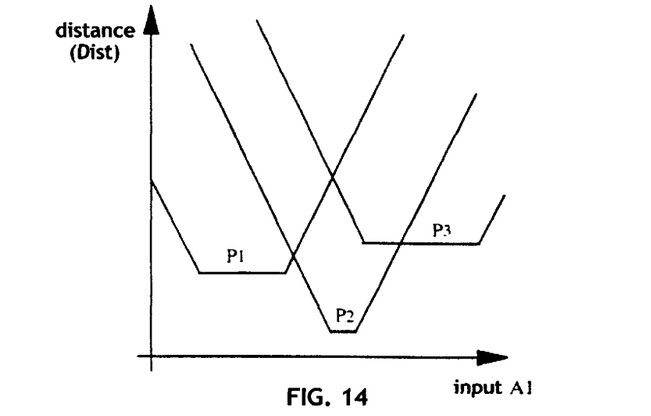
FIG. 14 shows the distance versus input diagram illustrating the transfer characteristics for three prototypes P1 to P3 having different offset values before offset correction.

FIG. 14 shows the distance versus input diagram illustrating the transfer characteristics for three prototypes P1 to P3 having different offset values before offset correction.

As apparent from relations (2) to (7) given above and in FIG. 14, the distance obtained according to the method of the present invention is substantially different from the classical distance (for a neural network as in FIG. 1) for two reasons: the presence of an offset in the result and a different slope of the distance evaluation function.

To obtain the same distance (and thus, the same neural network behavior), it is necessary to subtract the offset from the distance and to divide the result by two. The main drawback of this method is that it needs a subtraction function and a division function in each neuron.

Because, the slope is the same for all prototypes, it is not necessary to correct it. However, if desired, an easy way to correct the slope without a division circuit in each neuron consists of dividing each input data by two. On the other hand, as far as the offset is concerned, it is not possible to subtract it from the input data because the offset is not the same for all the neurons of the neural network.

Among the different types of neural networks based on a mapping of the input space, let us distinguish the cases of those operating in the ROI or in the KNN mode.

When the "don't care" is applied to the memorized prototypes, an efficient solution for ROI neural networks consists of including the offset correction in the threshold. Let us consider the distance with a determined prototype Pi. The relationship between the modified distance mentioned above represented by (DIST,Pi) and the distance which results from employing the present invention represented by (Dist,Pi) is such that: (DIST,Pi)=(Dist,Pi)−(offset,Pi) (8). Let us now assume that (T,Pi) is the classical threshold of the prototype Pi. As known for those skilled in the art, the neuron corresponding to prototype Pi fires if (DIST,Pi) <(T,Pi). According to equation (8), this neuron fires if (Dist,Pi)<(T,Pi)+(offset,Pi). As a result, the value of the new threshold (Tnew) is given by (Tnew,Pi)=(T,Pi)+ (offset,Pi). It is therefore possible to have the offset correction included in the neuron threshold.

When using "don't care" on memorized prototypes with neural networks operating in the KNN mode, which do not have a threshold, the above method cannot be used. In this case, another efficient method would consist of storing the complement of the offset in one or several of the prototype components and to put a null value in the corresponding components of the input data (the slope can still be corrected by dividing the input by two). This technique will be now described in more details.

For prototype Pi, using norm L1, (Dist,Pi)=|V1−Pi,1|+ |V2−Pi,2|+ . . . +|Vm−Pi,m|(9). To compare the distances of the different prototypes, it appears necessary to define a distance Dist' which would be independent of the offset of each prototype. To evaluate a distance independently of the offset, we have to subtract it. To that end, it is necessary to introduce an "adding component" Vk of network input vector V which is not impacted by the input vector A transformation. Now let Vk =0 and the corresponding prototype component Pi,k such that Pi,k=Vmax−(offset,Pi) (10) where Vmax is max(input range) as mentioned above by reference to FIG. 10B, i.e. the maximum value that a component can store. For the sake of simplicity, let us first assume that offset <Vmax for each neuron, we now have (Dist',Pi)=:V1−Pi,1|+|V2−Pi,2|+ . . . +|Vm−Pi,m|+Vmax−(offset,Pi) and finally, (Dist',Pi)=(Dist,Pi)−(offset,Pi)+Vmax (11). Therefore, the distance computed according to the present invention (Dist',Pi) represents the distance Dist of the prototype Pi minus the offset of said prototype Pi, plus a constant, the bias value Vmax, which is the same for all the neurons of the KNN neural network. As a consequence, the bias Vmax has no influence when looking for the closest neighbors (memorized prototypes).

Figure 15:
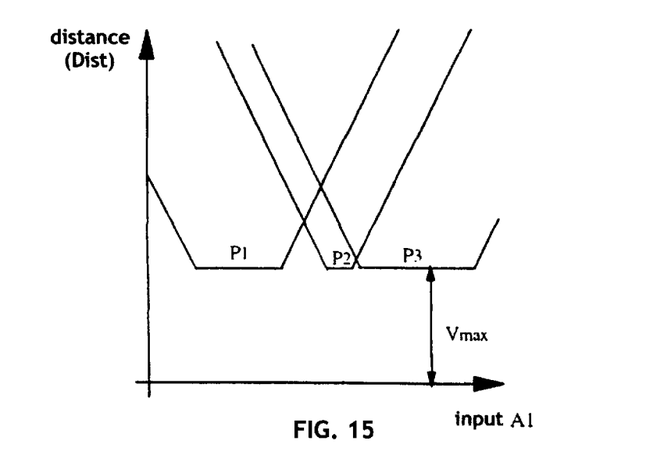
FIG. 15 shows the distance versus input diagram illustrating the transfer characteristics for the three prototypes P1 to P3 of FIG. 14 after offset correction.

FIG. 15 shows the distance (Dist') versus input diagram illustrating the transmission characteristics of the three prototypes P1, P2 and P3 of FIG. 14 after correction according to the present invention.

Now, if for some prototype, offset>Vmax, it is necessary to use more than one "adding component". If we consider offset Oi=|Pi,2−Pi,1| of prototype Pi, then the number of required prototype components will be: c=Φ ((Omax−Omin)/Vmax+1) where Φ (x) is the integer part of x, Omin and Omax are the minimum and the maximum value respectively of the offset for all the prototypes and Vmax is still the maximum value that a component can store. Thus to encode the offset Oi, it is necessary to use c prototype components in which the value (Omax−Oi)/c is stored (the input's corresponding components are set to 0). Then, during the distance evaluation, the offset Oi is added to (Omax−Oi) in order to obtain the same bias (Omax) in all the prototypes, thus the offset Oi is no longer relevant.

Now, let us consider the case where the "don't care" is applied on the input of the neural network. If it operates in the KNN mode, the offset does not need to be encoded as a prototype component, because in this case, the bias is the same for all the neurons.

If the neural network operates in the ROI mode, it is necessary to code the created offset (Oi=|V2−V1|) in the threshold to leave unchanged the neural network. Because this offset can change from one input data to another, it is necessary to use "adding components". In this case, the required number c (defined above) of components are set to zero in the prototypes and Omax is added to the threshold for each prototype during the learning phase. During the recognition phase, the "adding components" (equal to (Omax−Oi)/c) of the input data are used to inhibit the created offset by setting the resulting bias to Omax. The bias Omax, which is added to the distance during distance evaluation, has no effect because, as said above, this value has been added to the threshold of each prototype.

Figure 16:
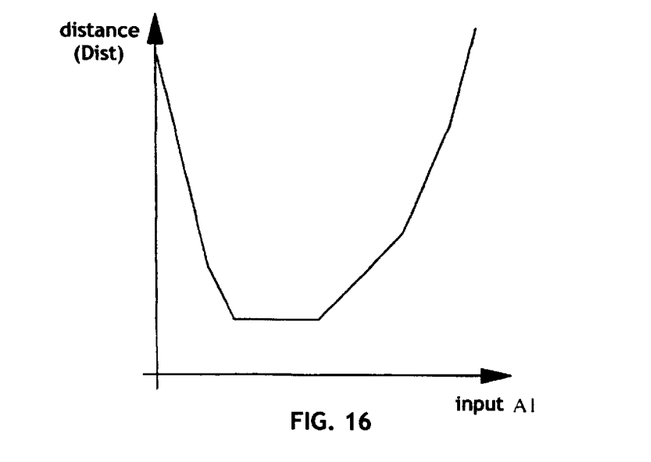
FIG. 16 shows the distance vs input diagram illustrating an example of a complex transfer characteristic that can now be obtained with the present invention.

FIG. 16 shows the distance vs input diagram illustrating a complex transmission characteristic that could be obtained using the circuits and method of the present invention. In this example, 6 components were used to code the input data during the recognition phase (V1=V2=V3=V4=V5=V6=A1). As a result, by using the required number of components and the adequate coding, one can create the transmission characteristic that is needed.

Physical Circuit Implementation

Figure 17:
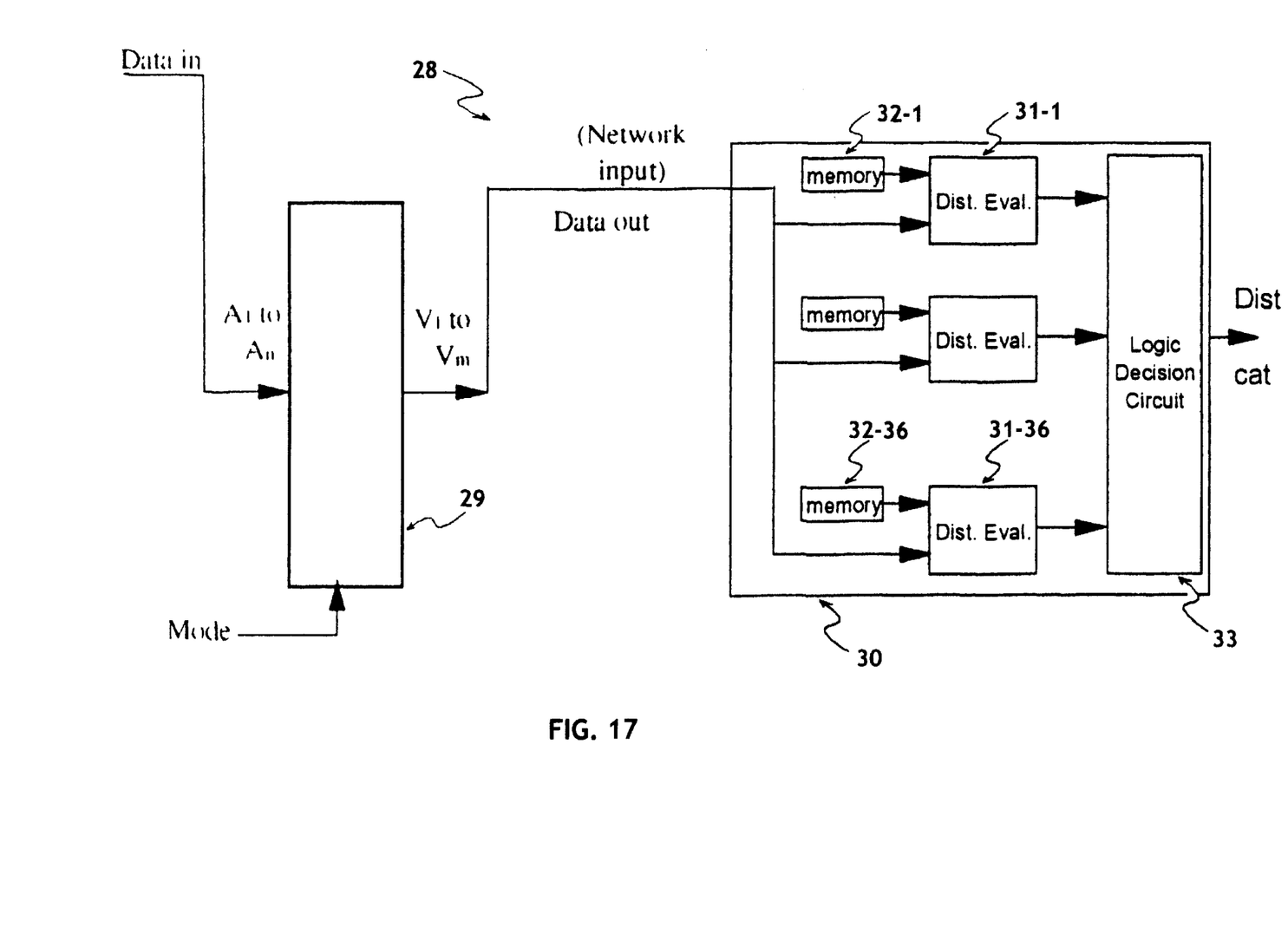
FIG. 17 shows the architecture of an improved neural network formed by the combination of a logic block according to the present invention and a conventional neural network based upon a mapping of the input space.

Basically, the present invention is implemented by adding a logic block of a specific type in front of any neural network based upon a mapping of the input space. The role of such a logic block is to transform the data input vector A's components before processing them in the neural network in order to create influence fields of various shapes. Now turning to FIG. 17, the novel architecture referenced 28 of an improved neural network according to the present invention schematically includes such logic block 29 and neural network 30. For sake of illustration, the neural network 30 will be the ZISC classifier described in the Boulet et al reference cited above.

Logic block 29 is provided with n inputs, which respectively correspond to the n components A1 to An of data input vector A and with m outputs, each being associated to a component V1 to Vm of the network input vector V. The particular implementation of FIG. 17 relies on only one data input line (Data In) and one data output line (Data Out) because the data is applied sequentially on the data input line and thus has to exit in the same format. However, a parallel implementation could be envisioned as well. The architecture of the ZISC classifier 30 shown in FIG. 17 has been reduced to only the elements that are necessary to understand the principles of the present invention. ZISC classifier 30 first includes a plurality of distance evaluator circuits 31-1 to 31-36. A first input of each distance evaluator circuit, e.g. 31-1, is connected to its corresponding RAM memory (64 words of eight bits), e.g. 32-1, and the second input is connected to the data input line which is thus common to all of said second inputs. All the outputs of the distance evaluator circuits are connected to a decision logic circuit 33 which determines the shortest distances and corresponding categories for all the neurons (mode KNN) or the neuron which has "fired" (mode ROI).

Let us consider a preferred physical implementation of logic block 29 which allows an efficient creation of "don't care" values, either partial or total, either on the memorized prototype or on the input data. Now turning to FIG. 18, logic block 29 consists of a switching circuit 34 and optionally, of a specific circuit 35, which in combination with circuit 34 can provide more complex transform functions than those offered by circuit 34 alone. In this case, input vector A components will be linearly or not linearly combined in circuit 35 to produce an intermediate input vector A1. In turn, the components of vector A' will be processed by circuit 34 as it were for input vector A according to the above described method. Circuit 34 includes a two-inputs multiplexor 36 and a register 37. A logic control block 38 driven by the mode signal, controls the register operation for the READ (r) and WRITE (w) operations and the control input of the multiplexer. The signal which represents the sequence of the input vector components is directly applied to a first input terminal of multiplexor 36 (input a) and via register 37 to its second input terminal (input b). In multiplexor 36, the selected input (a or b) depends on the logic level (0 or 1) of the signal applied to its control input, which in turn is derived of the mode signal applied to the decision logic block 38. For each component A1, . . . , An of input vector A, a mode is selected. Mode 0 corresponds to the multiplexor positioned on (a). In this mode, circuit 34 operates as an identity function, i.e. its output is equal to its input. Mode 1 operates quite differently, in this mode, it is required to change the selector position from (a) to (b). In this mode 1, the output of circuit 34 corresponds to its input in which all the input data are duplicated. As apparent for those skilled in the art many circuits may be envisioned to process the input data as described above by reference to circuit 34. Moreover, the function of circuit 34 can be performed by an adequate software as well.

Figure 18:
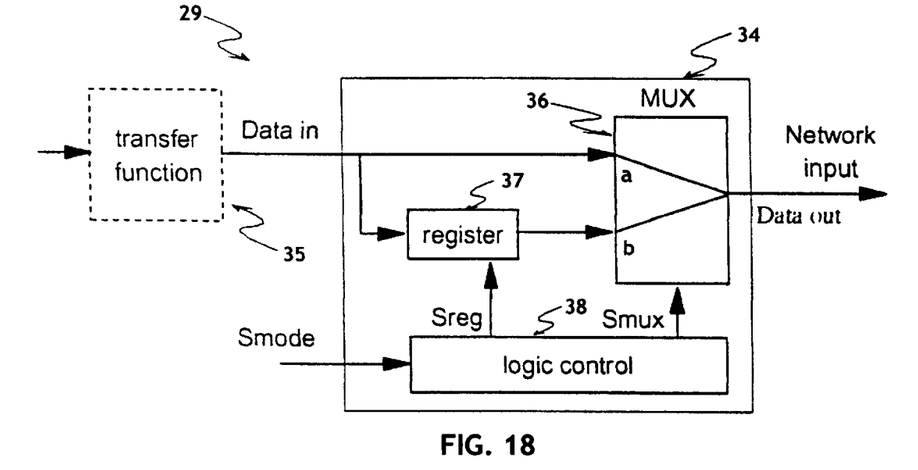
FIG. 18 shows the preferred circuit implementation of the logic block of FIG. 17.

For example, let us consider a two-component input vector A=(A1, A2). In mode 1, its corresponding output will be V=(A1, A1, A2, A2). With circuit 34, it is thus possible to use "don't care" values on the memorized prototypes by using the mode 0 during the learning phase (prototype memorization) in order to set the "don't care" range values in the classifier 30 and by using mode 1 during the recognition phase. To use "don't care" on the input data, one has to use mode 1 during the learning phase and mode 0 during the recognition phase.

As mentioned above, the purpose of logic block 35 is to combine input data in a determined order to introduce correlated data in the neural network 30. To that end, a transform function f is performed in circuit 34 such that each component which is output is the result of a computation done on one or several input data components. For example, let us consider an input vector A=(A1, A2, A3, A4); then its corresponding output will be V=(f1(A1, A2, A3, A4), f2(A1, A2, A3, A4), f3(A1, A2, A3, A4), f4(A1, A2, A3, A4)).

Figure 19:
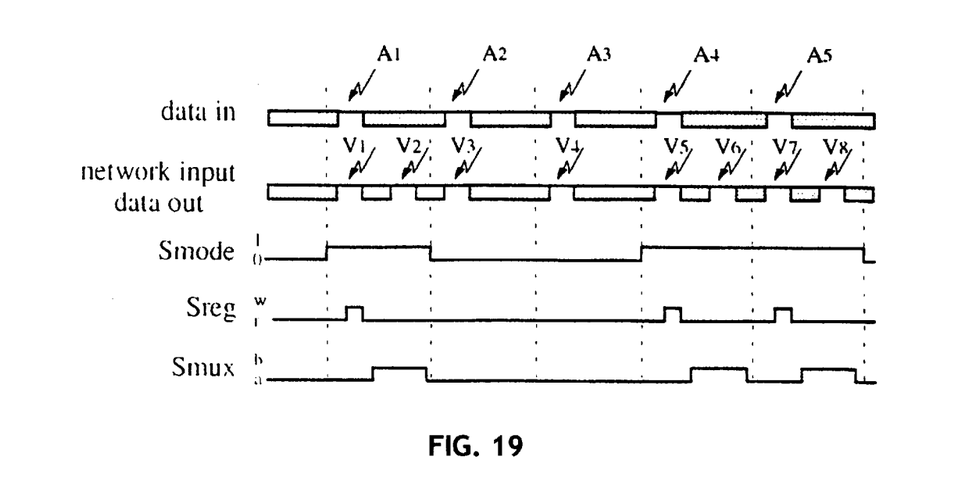
FIG. 19 shows the timing of the different input, output and control signals that are required to the FIG. 18 circuit operation.

FIG. 19 illustrates the FIG. 18 circuit operation. Mode signal (Smode) is used to control multiplexor 36 input terminal selection (a or b) with Smux signal and the writing of the input data in register 37 using Sreg signal (r or w, i.e. read or write respectively). As described above, mode 0 corresponds to multiplexor 36 positioned on (a) and mode 1 corresponds to multiplexor positioned on (a) as well as the written input data in the register 37 (Sreg=w) and the multiplexor positioned on (b) as well as the reading of the data which is memorized in the register (Sreg=r). For example, let us assume that the timing of FIG. 19 correspond to the recognition phase of an input vector A (A1, . . . , A6). The first input data, i.e. component A1, is processed as two network input components (V1, V2) to use a "don't care" on the memorized prototypes for which the first two components are different. In order to copy the input data on two network components, mode 1 (Smode=1) is used. In the first step, multiplexor is positioned on (a) (Smux=a) to put the A1 value in the V1 component and at the same time, register is set on write mode (Sreg=w) to write the A1 value in the register. In the second step, register is set in read mode (Sreg=r) and multiplexor is positioned on (b) (Smux=b) to read data A1 from the register in order to put it on the V2 component. The next two input data, i.e. components A2 and A3 are used either to create a "don't care" on the input (if the two corresponding components of the memorized prototype are equal) or are considered as two independent components. To put values A2 and A3 in components V3 and V4 respectively, it is necessary to use mode 0 (Smode=0). In this mode, multiplexor 36 is positioned on (a) (Smux=a) in order to put the input data Ai into the component Vj. The register is not used. The next input data, i.e. components A4 to A6, are processed the same way.

Figure 20:
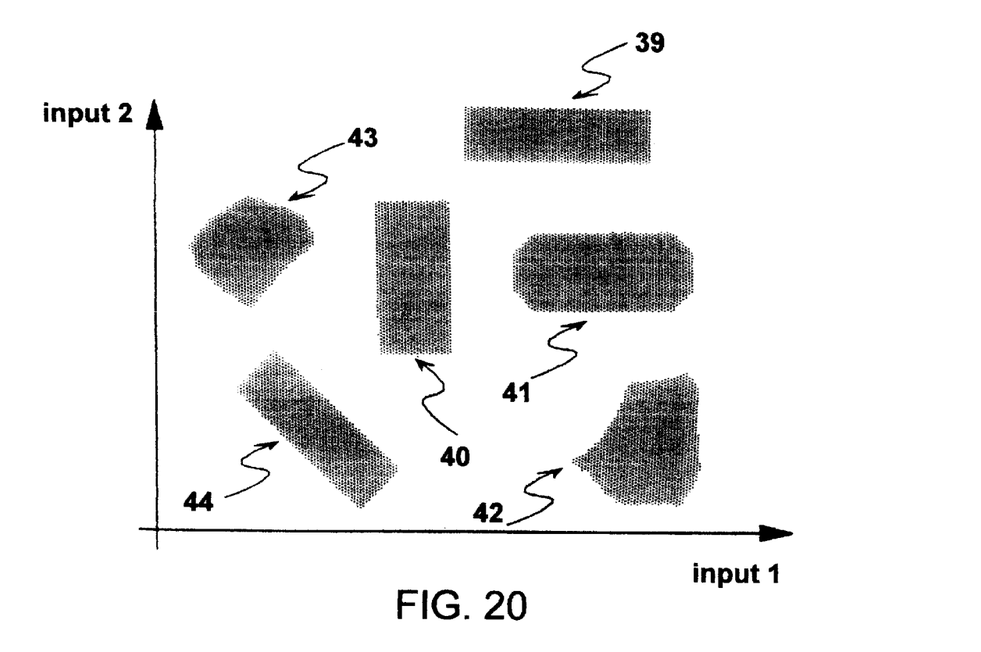
FIG. 20 shows different influence field shapes that can now be obtained in a two-dimensional space according to the present invention.

FIG. 20 shows examples, referenced 39, 40 and 41, of influence field shapes (in a two-dimensional space) that can be obtained in using the circuit 34 and the method of the present invention. The use of transfer functions in block 35 allows the creation of many other kinds of influence field shapes such as illustrated by references 42, 43 and 44. For instance, the influence field shape 44 is simply obtained by using V1=V2=(A1+A2)/2 and V3=V4=(Vmax+(A1−A2))/2, where Vmax represents the above mentioned bias, i.e. the maximum value that can be stored in a component during the recognition phase.

Figure 21:
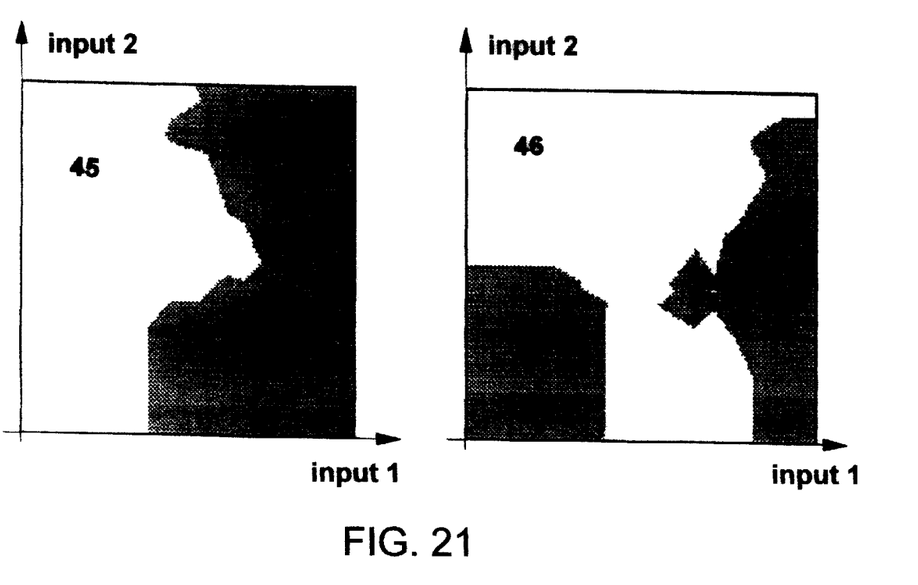
FIG. 21 shows the Voronoi representation of two complex shapes that can now be obtained in a two-dimensional space according to the present invention.

FIG. 21 shows the Voronoi representation of those results.

Now, if we generalize this approach to create any kind of influence field shape, each input data must be split into several network inputs using linear or non-linear transfer functions. The new created shapes allow the reduction of the number of memorized prototypes that are necessary to map a determined input space for better efficiency. Because this splitting will be performed in an independent layer of the neural network, no change will be required in its structure.

EXAMPLE

A frequent problem which consists of finding one or several words in a text stored in a database can be efficiently solved according to the present invention. Let us consider the following excerpt of the "BACKGROUND OF THE INVENTION" section:

"Artificial neural networks mimic biological nervous systems to solve problems which are difficult to modelize. Neural networks are able to learn from examples and in that sense, they are said to be "adaptive". Depending on the construction of neural networks, the learning phase could be supervised or not. Another important property of neural networks is their ability to show some tolerance for the imprecision and uncertainty which naturally exist in real-world problems to achieve tractability and robustness. In essence, these properties result from their massively parallel arrangement in which input data are distributed."

Let us now assume that the searched words in this text are "neural" and "data". With the neural network 28 of FIG. 17 wherein the ZISC classifier is used as the neural network 30, the network input vector V is comprised of 24 components (V1 to V24), which corresponds to 12 input data or components of input vector A, i.e. A1 to A12 during the recognition phase when using don't care on memorized prototypes that are all coded on 8 bits.

These two words "neural" and "data" can be used as memorized prototypes in the ZISC classifier and coded such as:

| | |
|---|---|
| P1: | #neural$$$$$ |
| P2: | #$neural$$$$ |
| P3: | #$$neural$$$ |
| P4: | #$$$neural$$ |
| P5: | #$$$$neural$ |
| P6: | #$$$$$neural |
| P7: | #data$$$$$$$ |
| P8: | #$data$$$$$$ |
| P9: | #$$data$$$$$ |
| P10: | #$$$data$$$$ |
| P11: | #$$$$data$$$ |
| P12: | #$$$$$data$$ |
| P13: | #$$$$$$data$ |
| P14: | #$$$$$$$data | wherein:

$ represents a total "don't care" value; it is a pair of components (0,255); # is an "adding component" used to code the offset in the prototype; it is a pair of components (255×(nbmax$−nb$)/2×nb#),255×(nbmax$−nb$)/2×nb#); £is an "adding component" of the input vector A used to inhibit the offset of each prototype during the recognition phase; it is a pair of components (0,0); each alphanumeric character is also a pair of components (x,x). nb# is the number of # in the current prototype; nb$ is the number of $ in the current prototype; nbmax$ is the maximum number of $ when considering all prototypes.

As a result, the 14 prototypes require 24 components of 8 bits each, over a total of 64 available components in the ZISC classifier. In the recognition mode, the searched text presented to the input of the neural network 28 as a series of phrases. The maximum length of the presented phrase is defined by the number of pair of components when using "don't care", i.e. 12, minus the number of pairs of components used to compensate the offset, i.e. 1, thus it is equal to 11 (11=12−1) in this example. A word is found when the minimum distance is equal to the bias Omax=255xnbmax$. So that the way to proceed is:

1. Send the first phrase to the classifier coded as: "£Artificial". Because the distance evaluation will be greater than the bias Omax, no word is found.
2. Send the second phrase to the classifier: "£cial neural". Now, the distance evaluation is equal to the bias Omax because of the content of memorized prototype P6, so that the word "neural" is found a first time.
3. Send the third phrase to the classifier: "£eural netwo", because the distance evaluation is superior to the bias Omax, this means that no word is found.

The process is automatically continued in that manner until the last word of the above cited text has been processed.

The solution offered by the neural network 28 of FIG. 14 and illustrated by reference to this example shows its efficiency to search for several words simultaneously when the classifier 30 cannot use a "match" or "no match" norm.

More generally, the method and system of the present invention have great interest every time noisy data (i.e. data in which no values are available for some components of the data) are used or when only a range of variations can be determined. These problems which can appear during either the learning phase or the recognition phase are solved thanks to the coding operation performed in circuit 34. Moreover, because of its flexibility, the method and system of the present invention, noisy and no noisy data can be mixed with an optimal use of hardware.

What is claimed is:

1. An improved neural network for classifying and identifying an input vector A having n components, comprising:
   a) encoding means responsive to said input vector A for encoding the n components of vector A into m components of an output vector V, such that at least one of said m components of the output vector V is a linear or non linear function of some of the n components of vector A and at least another one of said m components of the output vector V is identical to a corresponding component of the input vector A, for shaping the influence field of a first neuron differently than the influence field of a second neuron; and
   b) a neural network based upon a mapping of the input space having at least one input terminal for receiving the components of said vector V, said neural network including p neurons to store p prototypes, said neural network comprising:
      p memorization means, each being adapted to store m weights for each one of the p prototypes that have been previously loaded during a learning phase;
      q computing means, each being adapted to calculate a distance between vector V and a corresponding one of said prototypes; and,
      decision means that processes the p distances to elaborate the global response of the improved neural network based on the p prototype distances.

2. A method for classifying and identifying an input vector A having n components in an improved neural network having means for receiving said input vector and including a neural network based upon a mapping of the input space, said method comprising the steps of:
   a) encoding the n components of vector A into m components of an output vector V, such that at least one of said m components of the output vector V is a linear or non linear function of some of the n components of vector A and at least another one of said m components of the output vector V is identical to a corresponding component of the input vector A, for shaping the influence field of a first neuron differently than the influence field of a second neuron;
   b) applying the components of said output vector V to said neural network based upon a mapping of the input space having at least one input terminal for receiving the m components of said vector V and including p neurons to store m weights for each one of the p prototypes that have been previously loaded therein during a learning phase; each said neuron being adapted to compute a distance between output vector V and the prototype memorized therein; and,
   c) elaborating a global response of said improved neural network based on the p prototype distances.

* * * * *